United States Patent
Sales et al.

(10) Patent No.: US 10,122,848 B2
(45) Date of Patent: *Nov. 6, 2018

(54) CALLER PREVIEW FOR VIDEO CALLS

(71) Applicant: Google Inc., Mountain View, CA (US)

(72) Inventors: Heidi Rafael Sales, Seattle, WA (US); Rebecca Michael, San Francisco, CA (US); Koa Metter, Seattle, WA (US); Jason Cornwell, Mountain View, CA (US); Alan Lee Rogers, Seattle, WA (US); Richard Yuan-Ching Lo, Fremont, CA (US); Anna Maria Jansson, San Francisco, CA (US); Matthew Thomas Austin, Palo Alto, CA (US); Tyler Bahl, San Francisco, CA (US); Minjae Lee, San Francisco, CA (US); Justin Uberti, Mountain View, CA (US); Amit Fulay, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/701,094

(22) Filed: Sep. 11, 2017

(65) Prior Publication Data
US 2017/0374194 A1 Dec. 28, 2017

Related U.S. Application Data

(63) Continuation of application No. 15/153,684, filed on May 12, 2016, now Pat. No. 9,762,729.

(51) Int. Cl.
*H04N 7/15* (2006.01)
*H04M 3/42* (2006.01)
(Continued)

(52) U.S. Cl.
CPC .... *H04M 3/42042* (2013.01); *H04L 61/1594* (2013.01); *H04L 65/1069* (2013.01); *H04N 7/15* (2013.01); *H04W 4/02* (2013.01)

(58) Field of Classification Search
CPC combination set(s) only.
See application file for complete search history.

(56) References Cited

U.S. PATENT DOCUMENTS

| 6,853,911 B1 | 2/2005 | Sakarya | |
| 8,644,886 B1 * | 2/2014 | Delaney | H04M 3/533 455/415 |

(Continued)

FOREIGN PATENT DOCUMENTS

FR 2864406 6/2005

OTHER PUBLICATIONS

EPO, International Search Report for International Patent Application No. PCT/US2017/057047, dated Dec. 22, 2017, 5 pages.
(Continued)

*Primary Examiner* — Joseph J Nguyen
*Assistant Examiner* — Phung-Hoang J Nguyen
(74) *Attorney, Agent, or Firm* — IP Spring

(57) ABSTRACT

Implementations of the present application relate to caller previews for video calls. In some implementations, a method includes sending, by a caller device, a call request to a callee device and determining an identifier associated with the callee device. The method determines whether the identifier is associated with an address book of the caller device, and/or is in an outgoing call record of the caller device. An acknowledgment is received from callee device, and, upon receipt of the acknowledgment, a connection is established with the callee device. Based on determining that the identifier is associated with the address book and/or in the outgoing call record, at least a portion of a caller video is (Continued)

transmitted over the connection with the callee device. The caller video is transmitted prior to receipt of an acceptance of the call request from the callee device.

19 Claims, 6 Drawing Sheets

(51) Int. Cl.
  *H04L 29/06* (2006.01)
  *H04L 29/12* (2006.01)
  *H04W 4/02* (2018.01)

(56) References Cited

U.S. PATENT DOCUMENTS

| | | | |
|---|---|---|---|
| 8,676,273 B1* | 3/2014 | Fujisaki | H04M 1/6505 |
| | | | 455/567 |
| 8,831,191 B1 | 9/2014 | Vendrow | |
| 8,958,537 B1* | 2/2015 | Saylor | H04M 3/42068 |
| | | | 379/142.04 |
| 2003/0013461 A1* | 1/2003 | Mizune | H04M 1/72572 |
| | | | 455/456.1 |
| 2005/0015444 A1 | 1/2005 | Rambo | |
| 2005/0143103 A1 | 6/2005 | Bjorgan et al. | |
| 2006/0203802 A1 | 9/2006 | Chou et al. | |
| 2007/0186002 A1 | 8/2007 | Campbell et al. | |
| 2007/0263825 A1 | 11/2007 | Shah et al. | |
| 2008/0143816 A1 | 6/2008 | Zhang et al. | |
| 2008/0159522 A1 | 7/2008 | Ericson | |
| 2009/0147772 A1 | 6/2009 | Rao et al. | |
| 2010/0130213 A1 | 5/2010 | Vendrow et al. | |
| 2010/0158225 A1* | 6/2010 | Rogers | H04M 3/42042 |
| | | | 379/142.06 |
| 2010/0159909 A1 | 6/2010 | Stifelman | |
| 2010/0309282 A1 | 12/2010 | Hsieh | |
| 2011/0076003 A1 | 3/2011 | Cho et al. | |
| 2012/0026274 A1 | 2/2012 | Baker et al. | |
| 2012/0098919 A1 | 4/2012 | Tang et al. | |
| 2012/0268552 A1 | 10/2012 | Choi et al. | |
| 2013/0027504 A1 | 1/2013 | Zhang | |
| 2013/0083155 A1 | 4/2013 | Andresen | |
| 2013/0183947 A1 | 7/2013 | Bana | |
| 2013/0303132 A1* | 11/2013 | Kwong | H04M 3/02 |
| | | | 455/414.1 |
| 2013/0321553 A1 | 12/2013 | Lindberg et al. | |
| 2013/0329000 A1 | 12/2013 | Cain et al. | |
| 2013/0342637 A1 | 12/2013 | Felkai et al. | |
| 2014/0111596 A1 | 4/2014 | Grevers, Jr. | |
| 2014/0168344 A1* | 6/2014 | Shoemake | H04M 3/5315 |
| | | | 348/14.01 |
| 2014/0176659 A1 | 6/2014 | Khay-Ibbat et al. | |
| 2014/0245180 A1 | 8/2014 | Kuramura et al. | |
| 2014/0302830 A1 | 10/2014 | Yang et al. | |
| 2015/0215579 A1 | 7/2015 | Wang et al. | |
| 2015/0304490 A1 | 10/2015 | Huang et al. | |

OTHER PUBLICATIONS

EPO, Written Opinion for International Patent Application No. PCT/US2017/057047, dated Dec. 22, 2017, 8 pages.
European Patent Office, International Search Report for International Patent Application No. PCT/US2016/068440, dated Apr. 10, 2017, 6 pages.
European Patent Office, Written Opinion for International Patent Application No. PCT/US2016/068440, dated Apr. 10, 2017, 8 pages.
USPTO, Non-final Office Action for U.S. Appl. No. 15/153,684, dated Dec. 22, 2016, 10 pages.
USPTO, Notice of Allowance for U.S. Appl. No. 15/153,684, dated Apr. 20, 2017, 17 pages.
USPTO, First Action Interview, Pre-Interview Communication for U.S. Appl. No. 15/153,684, dated Jul. 27, 2016, 5 pages.
USPTO, Notice of Allowance for U.S. Appl. No. 15/466,806, dated Aug. 9, 2017, 19 pages.
USPTO, First Action Interview, Pre-Interview Communication for U.S. Appl. No. 15/815,564, dated Jun. 22, 2018, 4 pages.

* cited by examiner

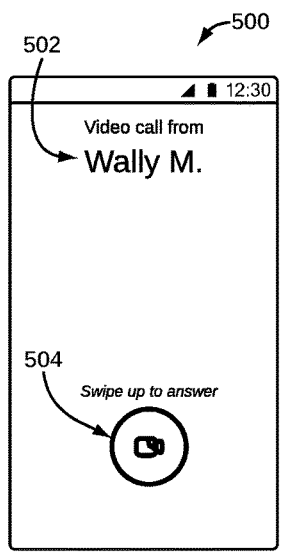
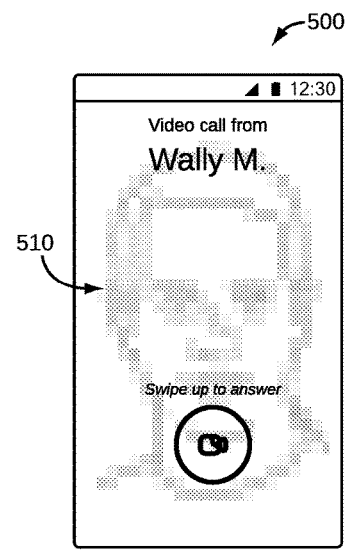
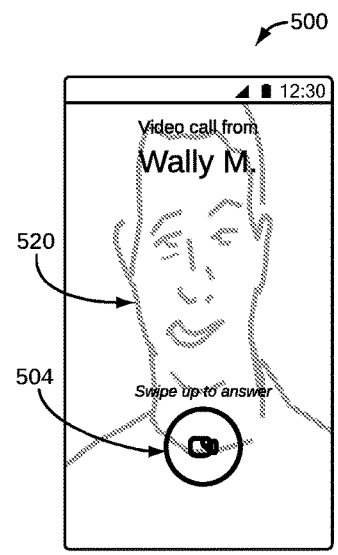
FIG. 5A    FIG. 5B    FIG. 5C
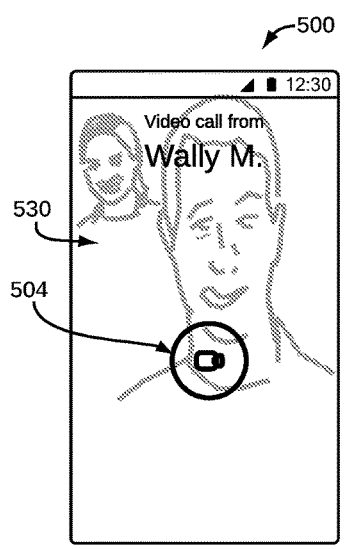
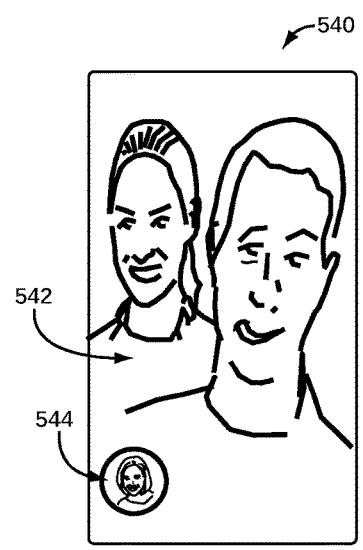
FIG. 5D    FIG. 5E

CALLER PREVIEW FOR VIDEO CALLS

CROSS-REFERENCE TO RELATED APPLICATIONS

This application is a continuation of U.S. patent application Ser. No. 15/153,684, titled CALLER PREVIEW FOR VIDEO CALLS and filed on May 12, 2016, which is incorporated by reference herein in its entirety.

BACKGROUND

The popularity and convenience of digital devices as well as the widespread of use of Internet communications have caused digital images and videos to become ubiquitous. Users of digital devices engage in many different forms of communication, including text chat, email, voice calls, and video calls. For example, video calls can be established between devices to provide, to the participants of the call, audio communication as well as video images depicting the participants.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of the present application relate to caller previews for video calls. In some implementations, a method includes sending, by a caller device, a call request to one or more callee devices and determining an identifier associated with the one or more callee devices. The method includes determining whether the identifier is at least one of: (i) associated with an address book of the caller device and (ii) in an outgoing call record of the caller device. An acknowledgment is received from at least one of the one or more callee devices, and, upon receipt of the acknowledgment, a connection is established with the at least one of the one or more callee devices. Based on determining that the identifier is at least one of: (i) associated with an address book of the caller device and (ii) in an outgoing call record of the caller device, the method includes transmitting at least a portion of a caller video over the connection with the at least one of the one or more callee devices. The caller video is transmitted prior to receipt of an acceptance of the call request from the at least one of the callee devices.

Various implementations and examples of the method are described. For example, the method can further include, prior to transmitting the caller video, filtering the caller video by application of a video filter to the caller video. In some examples, the video filter can includes a blur filter and/or a hexagon mosaic. The method can further include receiving input to disable the video filter, and in response to the user input, disabling the filter. For example, receiving input can include receiving an indication from the at least one callee device to disable the video filter, and/or receiving an indication from the at least one callee device that the callee device has detected a face. The method can further include receiving the acceptance of the call request from the at least one callee device, and in response to receiving the acceptance of the call request, disabling the filter.

The method can further include receiving the acceptance of the call request, receiving a callee video from the at least one callee device, and causing the callee video to be displayed by the caller device. The method can include receiving callee audio from the at least one callee device and causing output of the callee audio by the caller device. In another example, the method can further include receiving the acceptance of the call request from the at least one of the one or more callee devices, and in response, transmitting caller audio to the at least one of the one or more callee devices.

In some implementations, a method can include sending, by a caller device, a call request to one or more callee devices, and establishing a connection with at least one of the one or more callee devices. The method includes determining a caller context, and based on the determined caller context, selecting a caller video. The method includes transmitting at least a portion of the selected caller video over the connection with the at least one callee device prior to receiving an acceptance of the call request by the at least one callee device.

Various implementations and examples of the method are described. For example, determining the caller context can include determining a caller device location and/or a current time. Determining the caller context can include capturing one or more videos from two or more cameras of the caller device, and selecting a caller video can include selecting one of the videos captured from the two or more cameras. Selecting a caller video can include selecting a video from a camera of the caller device, a previously captured video, a stock video, a previously captured image, and/or an application video from an application under execution on the caller device. For example, selecting the caller video can include selecting a stock video based on the caller device location, where the stock video is stored in storage accessible to the caller device.

In some examples, selecting a caller video can include determining a respective selection score for the videos based on the caller context, comparing the respective selection score of each of the captured videos with a threshold to identify one or more videos that meet the threshold, and based on the comparing, selecting at least one of the identified videos as the caller video. For example, selecting at least one of the identified videos as the caller video can include selecting a particular video that has a best selection score. Selecting at least one of the identified videos as the caller video can include selecting two or more of the identified videos that meet the threshold, and generating the caller video that combines the two or more videos. The method can further include receiving user input effective to select the caller video. The method can further include receiving an acknowledgment from the at least one callee device after sending the call request, where the connection is established upon receipt of the acknowledgment.

In some implementations, a device includes a storage device and at least one processor configured to access the storage device and configured to perform operations including sending a call request to one or more callee devices, and receiving an acknowledgment from at least one of the one or more callee devices. Upon receipt of the acknowledgment, the operations include establishing a connection with the at least one of the one or more callee devices, determining a caller context, and based on the caller context, selecting a caller video. The operations include transmitting a caller video over the connection with the at least one callee device prior to receiving an acceptance of the call request by the at least one callee device. In some examples, the operation of determining the caller context can include determining a geographic location of the device, and the operation of selecting a caller video can include selecting one of a plurality of videos captured from two or more cameras of the device.

BRIEF DESCRIPTION OF THE DRAWINGS

FIG. 5A-5E are diagrammatic illustrations of example representations of a user interface showing one or more features described herein, according to some implementations.

DETAILED DESCRIPTION

Figure 1:
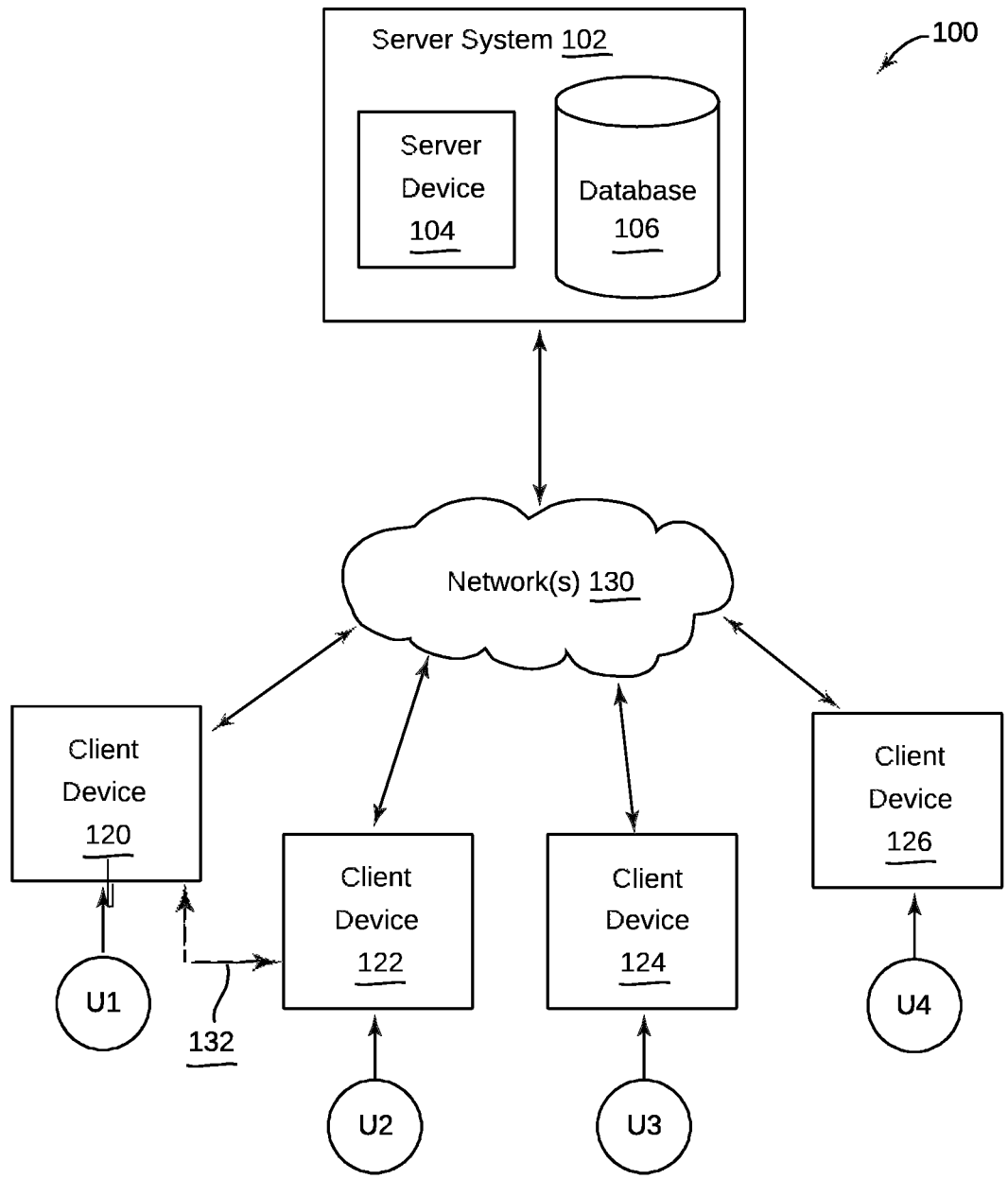
FIG. 1 is a block diagram of an example network environment which may be used for one or more implementations described herein.

One or more implementations described herein relate to providing a caller preview for video calls. In some implementations, a caller device sends a call request to a callee device. The caller device can determine an identifier associated with the callee device and, in some implementations, can determine whether the identifier is associated with an address book of the caller device and/or whether the identifier is in an outgoing call record of the caller device. If either of these is determined, then after establishing a connection with the callee device, the caller device transmits at least a portion of a caller video over the connection with the callee device prior to receipt of an acceptance of the call request from the callee device. This allows the callee device to display caller video prior to a callee accepting a call, e.g., as an automatic video preview as to who is calling the callee.

Various implementations can filter the caller video before the callee accepts the call, e.g., by applying a video filter to the caller video prior to transmitting the caller video, such as a blur filter, a hexagon mosaic filter, etc. For example, this can provide privacy to the display of the caller video on the callee device, e.g., if the callee is in a public place or other environment in which a video from the caller is not desired to be clearly displayed. In some examples, the callee device can provide an indication to the caller device to disable the video filter, e.g., before the callee accepts the call. For example, this can allow the callee to see the transmitted caller video more clearly before accepting the call. In some examples, this indication to disable the filter can be automatically sent by the callee device under particular conditions, e.g., if the callee device detects that the callee is viewing the callee device, the callee has picked up the callee device, etc. In some implementations, audio data associated with the caller video is not transmitted by the caller device or is disabled until the callee accepts the call request.

Some implementations can transmit a caller video that has been automatically selected from multiple available videos based on caller context. For example, the caller device can send a call request to a callee device and a connection can be established prior to callee acceptance of the call request. A caller context can be determined, and, based on the determined caller context, a caller video is selected. At least a portion of the selected caller video is transmitted over the connection to the callee device prior to receiving an acceptance of the call request by the callee device.

The caller context can include a variety of factors, e.g., a caller device location, a current time, or other factors, e.g., based on device sensors, user data (if user consent has been obtained), etc. The caller video can be selected from multiple available videos, including videos being captured by multiple cameras of the caller device (e.g., front and back cameras), previously-captured and recorded videos, stock videos, an application video from an application, etc. Some implementations can combine multiple videos into the transmitted caller video. Some implementations can determine selection scores for multiple available videos to determine which video to select for transmission, e.g., the best-scoring video, videos that have a score above a threshold, etc. User input can select a video or override an automatically-selected video.

One or more features described herein allow a caller video to be automatically (without user intervention) determined and transmitted to callee devices, e.g., to provide a preview of a caller for the callee. In some implementations, the caller video can be automatically determined to be sent based on whether the callee is included in the caller's address book or outgoing call record. This allows caller videos to automatically be sent to users that are likely to be known to the caller, and the caller need not personally examine callees to determine if caller video should be sent. Described features can also include filtering for the caller video to protect privacy of callers displayed on the callee device. In addition, described features allow one of multiple available caller videos to be automatically selected to be transmitted to a callee as a preview. A caller video can be selected based on the current context of the caller, e.g., to determine which camera of multiple cameras on the caller device to use to capture the video that is sent to the callee, or which stored video to send to the callee. Such features allow caller videos of high relevance to the caller context and high user interest to be automatically determined and transmitted in a preview video to a caller before the caller accepts a call request. In some cases, this can encourage the callee to accept the call. The caller need not manually select a video, or select a camera to transmit video, before each call request. Furthermore, described features allow multiple videos to be combined in a caller video.

Described features can provide automatic selection and transmission of caller video prior to a callee's acceptance of a call. Relevant and interesting caller videos can be selected and transmitted to a callee without requiring caller intervention, and allow a callee to determine more consistently and reliably whether to accept a video call. Caller videos can be automatically sent to known callees and filtered at appropriate stages to provide privacy. Described features can allow a device to provide preview caller videos to a callee without the time and device processing required for the caller user to manually designate appropriate caller videos and to designate various video call options (filtering, etc.). Consequently, a technical effect of one or more described implementations is that selection and transmission of caller videos is reduced in computational time and resources expended to obtain results. For example, a technical effect of described features is a reduction in the problem of consumption of system processing resources required for display and selection of options related to caller videos that may otherwise be used by a system to provide manual options for video calls. Furthermore, a technical effect of described features is a reduction in the problem of consumption of system processing resources required for a callee device when accepting video calls that would not be accepted if relevant preview caller videos are first presented.

One or more systems and methods discussed herein do not require collection or usage of user personal information. In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., a desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some example implementations, users U1, U2, U3, and U4 may interact with each other via applications running on respective client devices and/or server system 102. In some implementations, the interaction may be performed via a network service, e.g., a social network service or other type of network service implemented on server system 102. For example, respective client devices 120, 122, 124, and 126 may communicate data to and from one or more server systems (e.g., system 102). In some implementations, server system 102 may provide appropriate data to the client devices such that each client device can receive communicated content or shared content uploaded to the server system 102 and/or network service. In some examples, the network service can include any system allowing users to perform a variety of communications (e.g., voice calls, video calls, chat, messaging, etc.), form links and associations, upload and post shared content such as images, video, audio, and other types of content, receive various forms of data, and/or perform socially-related functions. For example, the network service can allow a user to send messages to particular or multiple other users, form social links in the form of associations to other users within the network service, group other users in user lists, friends lists, or other user groups, post or send content including text, images, video sequences, audio sequences or recordings, or other types of content for access by designated users or sets of users of the network service, participate in live video, audio, and/or text chat with other users of the service, etc. Voice calls, video calls, and other communications can be provided using known protocols, e.g., Session Initiation Protocol (SIP) or other VOIP protocols, cell phone networks, Public Switched Phone Network (PTSN), etc., or customized protocols for particular applications. In some implementations, a "user" can include one or more programs or virtual entities, as well as persons that interface with the system or network.

A user interface can enable display of images, video data, and other content as well as communications, privacy settings, notifications, and other data on a client device 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, such as a display screen, projector, etc. In some implementations, application programs running on a server system can communicate with a client device to receive user input at the client device and to output data such as visual data, audio data, etc. at the client device.

In some implementations, server system 102 and/or one or more client devices 120-126 can provide one or more communication applications. A communication application may provide one or more communication functions. For example, the functions can include allowing a device to initiate and receive calls with other devices, communicate data with other devices over the network 130, e.g., in chats, voice calls, video calls, etc. The communication application can output related data including communication controls, contact lists, contact identifiers, text and video, etc. The communication application can provide an associated user interface that is displayed on a display device associated with the server system or client device. The user interface may provide various functions for the communication application, allowing the user to select and control available functions.

Other implementations of features described herein can use any type of system and/or service. For example, video call services, photo collection services, or other network services (e.g., connected to the Internet) can be used instead of or in addition to a social networking service. Any type of electronic device can make use of features described herein. Some implementations can provide features described herein on client or server devices intermittently connected to computer networks. In some examples, a client device including or connected to a display device can process and display data stored on storage devices local to the client device (e.g., not connected via a communication network) and can provide features and results as described herein that are viewable to a user.

Figure 2:
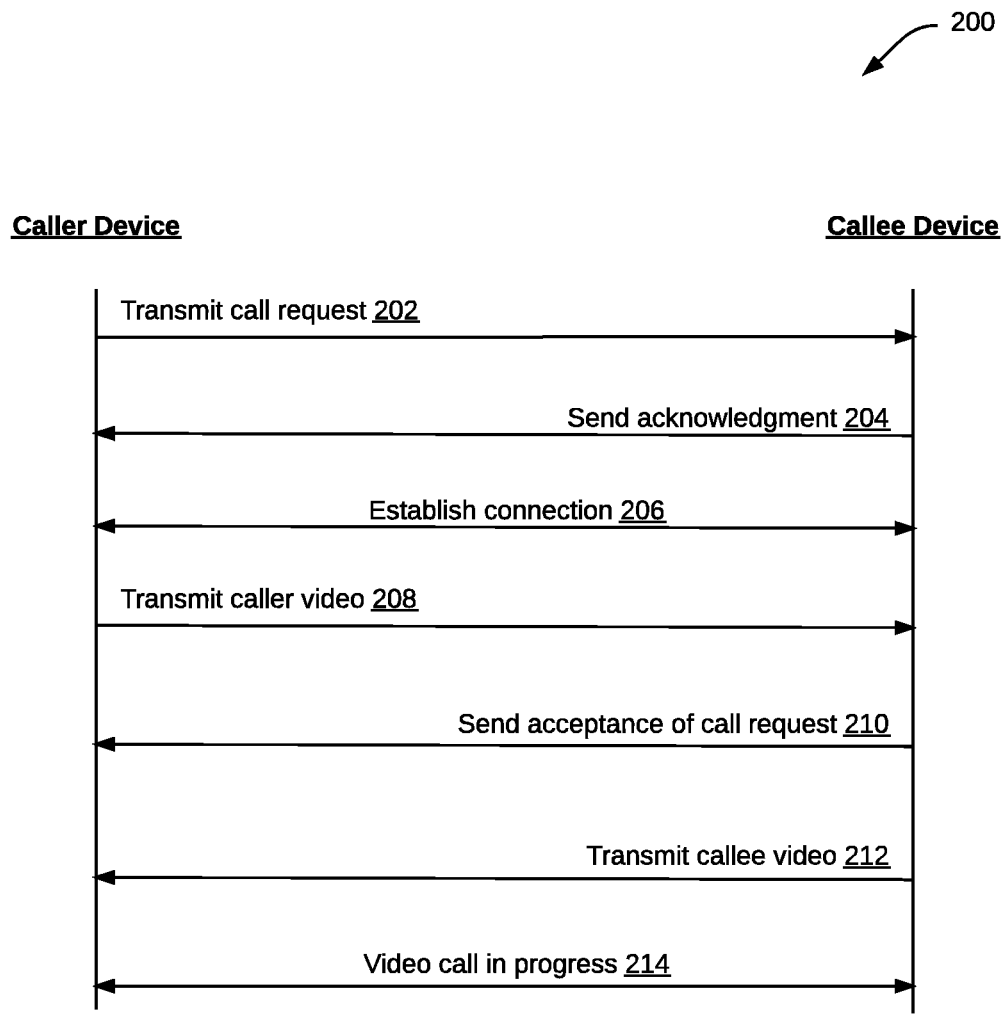
FIG. 2 is a diagram illustrating communications between a caller device and a callee device, according to some implementations.

FIG. 2 is a diagram illustrating communications 200 between a caller device and a callee device using one or more features described herein, according to some implementations. For example, the caller device and callee device can be client devices as described with reference to FIG. 1, and/or one or both devices can be server devices in some implementations.

A caller device transmits a call request (202) for a video call over a network to one or more callee devices. In response to the request, the callee device sends an acknowledgment to the caller device (204). In various implementations, the acknowledgment may be transmitted without an explicit user action, e.g., without a callee performing any action. The acknowledgment is transmitted prior to initiation of the video call. A connection is established (206) via the network. In various implementations, establishment of the connection may follow a protocol that includes a handshake between the caller device and the callee device that sent the acknowledgment. Further, as part of establishment of the connection, the caller device and the callee device may negotiate connection parameters, e.g., a media encoding technique for the connection. For example, the media encoding technique may be selected based on available bandwidth, measured delay, processing capabilities of the caller device and the callee device, etc. After the connection is established, caller video may be transmitted (208) from the caller device to the callee device. In various implementations, the caller video may be filtered video or unfiltered video. Various examples of caller video that can be transmitted at this stage are described herein.

While the caller video transmission is in progress over the connection, a callee device sends an acceptance of the call request (210) to the caller device. For example, the callee device sends the acceptance in response to user input. Further, the callee device transmits callee video (212) over the connection. The video call starts and remains in progress (214), e.g., until a callee or a caller hangs up, or the connection is broken for some reason, e.g., a loss of connectivity at one or both of the caller device and the callee device.

Figure 3:
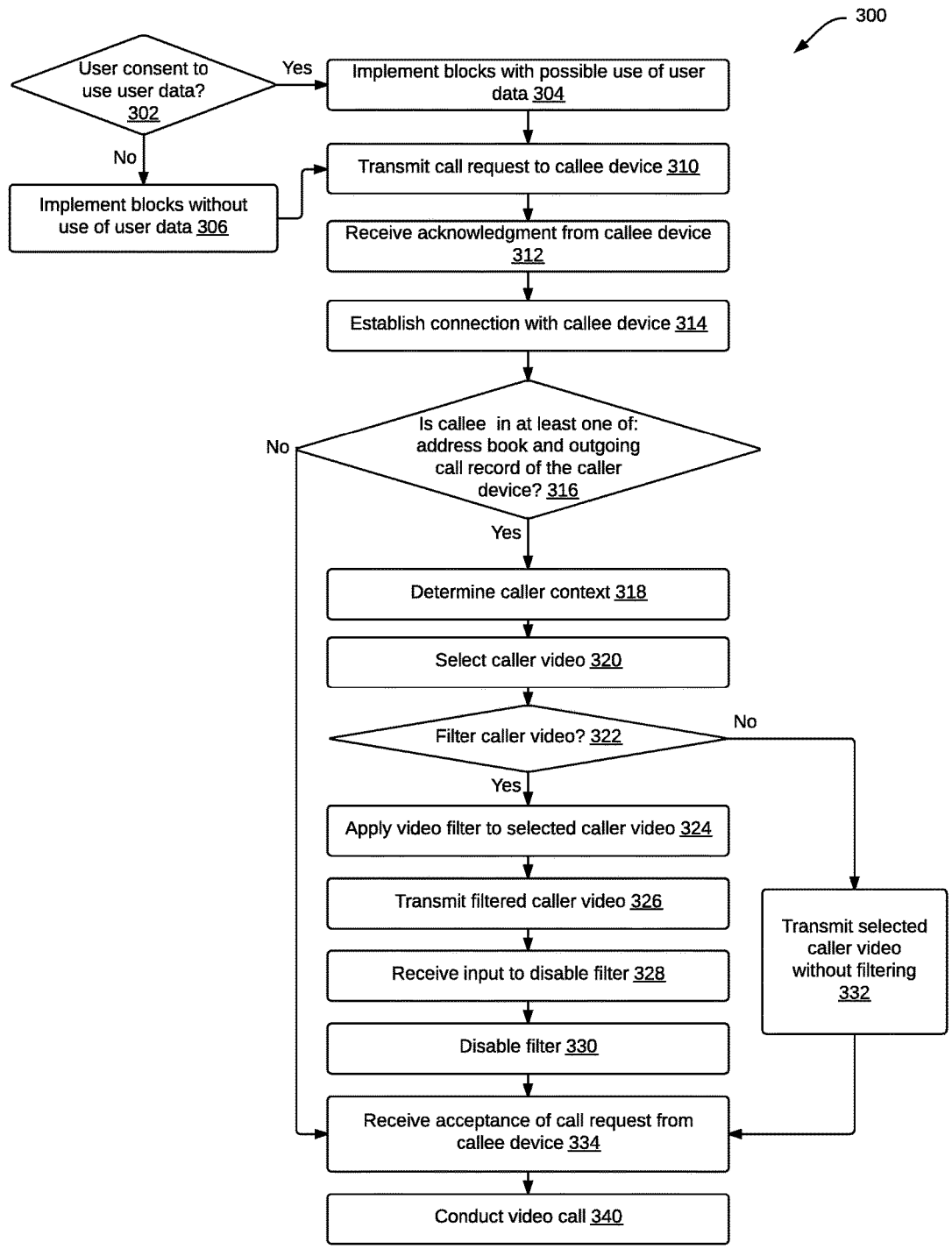
FIG. 3 is a flow diagram illustrating an example method for a caller device, according to some implementations.

FIG. 3 is a flow diagram illustrating an example method 300 for a caller device, according to some implementations. Some or all of the method 300 can be implemented, for example, on a system such as one or more client devices 120, 122, 124, or 126 as shown in FIG. 1. In some implementations, method 300 can be implemented on a server system 102 as shown in FIG. 1, and/or on both a server system and a client system. In described examples, the implementing system includes one or more processors or processing circuitry, and one or more storage devices. In some implementations, different components of one or more clients and/or servers can perform different blocks or other parts of the method 300.

A video as described herein can include multiple digital images, each image composed of multiple pixels, for example. A video can be any collection of images, e.g., a sequence of images, a series of images (e.g., frames) displayed over time, an animation, a cinemagraph, etc. An image or video as described herein can be stored on one or more storage devices of the implementing system or otherwise accessible to the system, such as a connected storage device, e.g., a local storage device and/or storage device connected over a network. In various implementations, images and videos can be obtained from a variety of sources. For a particular user, images and videos may be obtained from uploads or other transmissions by a user to a server over one or more networks, from an album or other stored collection of multiple images and videos owned or accessible by a user, etc.

In block 302, it is checked whether user consent (e.g., user permission) has been obtained to use user data in the implementation of method 300. For example, user data can include user preferences, user biometric information, user characteristics (identity, name, age, gender, profession, etc.), information about a user's social network and contacts, social and other types of actions and activities, content, ratings, and opinions created or submitted by a user, a user's current location, historical user data, etc. One or more blocks of the methods described herein may use such user data in some implementations. If user consent has been obtained from the relevant users for which user data may be used in the method 300, then in block 304, it is determined that the blocks of the methods herein can be implemented with possible use of user data as described for those blocks, and the method continues to block 310. If user consent has not been obtained, it is determined in block 306 that blocks are to be implemented without use of user data, and the method continues to block 310. In some implementations, if user consent has not been obtained, the remainder of method 300 is not performed.

In block 310, a call request is transmitted from a caller device to one or more callee devices. In this description, a single callee is generally described for explanatory purposes, although multiple callees can be provided. In various implementations, the caller device may be any device that can conduct calls, e.g., video calls. For example, the caller device may be a mobile phone, a computer, a wearable device, etc. In some implementations, a caller user (e.g., "caller") may select a particular entry from an address book that designates the callee user (e.g., "callee"), and the call request is transmitted in response to the selection. In some implementations, a caller may select a particular entry from an outgoing call record that designates the callee, and the call request is transmitted in response to the selection. In some implementations, e.g., when the callee is not in the address book or the outgoing call record of the caller, the callee may input text corresponding to an identifier of the callee, and the caller device can send the call request based on the identified callee.

In various implementations, the caller may select the callee by any of a variety of input techniques. In some examples, the caller may input text corresponding to the callee's name, telephone number etc., e.g., "Abby C.", "404-XXX-YYYY," etc. In another example, the caller may select an entry corresponding to the callee, e.g., an entry that is an item displayed in a displayed user interface selected via a touchscreen, a keyboard, a trackpad, a mouse or other pointing device, etc. In another example, the caller may speak the callee's name, e.g., with a command; for example, "Call Abby." In various implementations, an identifier of the callee may be stored in an entry in an address book (e.g., contact list) of the caller or in an outgoing call record of the caller, e.g., stored on the caller device and/or on available storage of a server or other device over a network. In various implementations, the address book may include a list of contacts that the caller has stored, or a list of contacts that has automatically been saved for the caller, e.g., based on synchronizing the address book with an online service or other information source. In various implementations, the outgoing call record may include a list of identifiers that the caller has previously called, e.g., using the particular caller device or any device that is associated with the caller.

In various implementations, the identifier may correspond to information that uniquely identifies the callee. For example, the identifier may be a telephone number of the callee. In another example, the identifier may be an email address of the callee. In another example, the identifier may be a network service identifier (e.g., social network identifier) corresponding to a network account of the callee used on the network service. In some examples, the identifier may be a login name, a screen name, a user id, etc. of the callee for a particular calling service, e.g., video calling services.

In various implementations, the callee may utilize one or more devices to conduct calls, e.g., video calls. For example, a callee may conduct calls using any device capable of such communication, such as a mobile phone, a computer, a wearable device, etc. In various implementations, the identifier of the callee may be associated with one or more callee devices. For example, a network account of the callee may be associated with her mobile phone, computer, and wearable device, e.g., a social network account or account on another network service. In another example, a telephone number of the callee may be associated with her mobile phone. In various examples, the identifier may be associated with one or more callee devices.

In some implementations, the call request may be transmitted to each callee device that is associated with the identifier. In some implementations, the call request may be transmitted to a subset of callee devices that are associated with the identifier. In some implementations, the call request may be transmitted to a single callee device.

In block 312, an acknowledgment is received from the callee device. For example, the acknowledgment may be received from one or more of the callee devices. In various implementations, the acknowledgment may indicate that the one or more callee devices are reachable over a network. In various implementations, the acknowledgment may be received from the callee device without any action or input from the callee. For example, the callee device may automatically transmit an acknowledgment back to the caller device.

In block 314, a connection is established between the caller device and the callee device from which the acknowledgment is received. For example, the connection may be established over the network. In various implementations, establishing the connection may be carried out via any suitable protocol, e.g., a session initiation protocol (SIP) or other protocol. In some implementations, a media encoding technique, e.g., an audio/video encoding technique may be automatically selected for the connection. For example, the media encoding technique may be selected based on various parameters including, but not limited to, connection bandwidth, delay and packet loss metrics, processor capability of the caller device and the callee device, etc. For example, a media encoding technique for a lower amount of bandwidth on the connection may compress video data and/or audio data to a greater degree than if a higher amount of bandwidth were present on the connection. In some implementations, the connection may be established such that the caller device can transmit media, e.g., video, to the callee device, but the callee device cannot transmit media to the caller device. In some implementations, the connection may be established such that the caller device and the callee device can transmit media to each other via the network.

In block 316, with user consent to use of such data, it is determined whether the callee identifier was previously stored in call-related storage associated with the caller (or caller device), e.g., whether the caller identifier is presently stored in at least one of the address book of the caller and the outgoing call record of the caller. Presence of the callee identifier in the address book may indicate that the caller knows the callee, e.g., the caller is a friend, colleague, acquaintance, business contact, etc. of the caller. In some examples, the caller may have input the callee identifier in the address book, may have accepted the entry of the callee identifier in the address book by another source or process (e.g., by software, device, or automatic process), etc.

Presence of the callee identifier in the outgoing call record may indicate, in some implementations, that the caller previously and recently interacted with the callee, e.g., placed a call to the callee. In various implementations, the outgoing call record may include identifiers that the caller has called in the recent past, e.g., within the previous 24 hours, within the past week, within the past month, within the past year, etc. In these implementations, the period for which the outgoing call record is stored may be user configurable. In some implementations, the outgoing call record may include identifiers for a certain number of recent calls, e.g., last 50 calls, last 500 calls, etc. In these implementations, the particular number of calls stored in the outgoing call record may be user configurable. In some implementations, the outgoing call record may include a history of all prior outgoing calls. In some implementations, no outgoing call record may be maintained such that the outgoing call record is empty, e.g., based on a user preference.

In some implementations, particular portions or sections of call-related storage of the caller can be associated with the use of caller videos as determined and transmitted in method 300, e.g., preview caller videos transmitted to the callee prior to callee acceptance of the call. Other portions of the caller's call-related storage can be unassociated with preview caller videos. For example, the caller may designate particular data, e.g., address books, portions of address books (e.g., close family members), users indicated in particular date ranges (e.g., who participated in previous calls with the caller), particular users stored in an address book or outgoing call record, or other sections of call-related storage. For example, the caller can perform selections of such data displayed in a user interface using selection features of the user interface. Block 316 can then examine only the designated data to determine if the callee identifier is present, and the undesignated data is not checked. This allows a caller to, for example, designate particular address books, particular sections of outgoing call records, and/or particular users for which a preview caller video will be transmitted prior to callee acceptance, and/or designate other address books, outgoing records, and users for which a caller video will not be transmitted prior to callee acceptance.

If it is determined that the callee is in call-related storage of the caller, e.g., in at least one of the address book of the caller and the outgoing call record of the caller, the method continues to block 318. If it is determined that the callee is not in call-related storage, e.g., in neither of the address book and the outgoing call record, the method continues to block 334, such that no caller video is transmitted prior to receipt of the acceptance of the call request.

In block 318, a caller context is determined. In various implementations, the caller context may be determined based on any of multiple factors including a caller device location, a current time at which the call request is transmitted, and/or a variety of other factors. For example, the caller device location may be determined based on a global positioning system (GPS) sensor in the caller device, by signal triangulation of a wireless network that the caller device is coupled to, etc. In various implementations, when the caller user consents to use of user data, the variety of factors indicating caller context can include the caller being accompanied by or being near a friend or a family member and/or being at a particular event (e.g., a birthday celebration, a wedding, a party, a basketball game, a graduation ceremony, etc.), factors being associated with the current location or current time (being located at home, at work, on vacation, at a friend's home, in the morning or late at night, etc.), etc. In some implementations, when the caller user consents to use of user data, the variety of context factors may include the callee identifier, e.g., the particular callee selected for the video call. For example, with user consent of the callee, the caller device may have access to preferences or other information indicating types or content of video which this particular callee may prefer to see, and/or other user data of the callee. In some implementations, one or more context factors can be determined based on capturing video from one or more cameras of the caller device at the time (or shortly before the time) the context is determined, if user consent has been obtained. For example, if user consent has been obtained, content of the captured video can be analyzed and types of objects detected using image object detection techniques (e.g., to detect faces, monuments, landscapes, objects, etc.). In some implementations, one or more factors can be determined based on user data if user consent has been obtained, e.g., calendar data (e.g., indicating events), activity data, etc. of the caller that is accessible to the caller device.

In block 320, a caller video is selected for transmission to the callee device. In various implementations, the caller video may be selected from one or more available videos. The videos can include a number of images (e.g., frames) to be displayed sequentially, e.g., at a particular frame rate or duration of display for each frame, or varying frame rates or display durations for frames.

In some examples, the available videos may include videos captured live, e.g., at the current time, or at or after the time of the call request, by one or more cameras of the caller device. For example, if the caller device is a mobile phone or other mobile device with one front camera and one back camera, the available videos may include videos captured by each of the front camera and the back camera. In another example, the available videos may include videos or images previously captured by the one or more cameras of the caller device and stored on the caller device. In another example, the available videos may include any video (or image, animation, cinemagraph, etc.) stored on the caller device. For example, the available videos can include a plurality of stored images or a video recorded from a previous video call, or a portion (e.g., a motion clip) of a video recorded from a previous call. In some implementations, motion clips formed from portions of video data captured during one or more previous video calls may be used as visual user identifiers or user avatars to represent associated users in user interface displays on the caller device, e.g., in a contact list of users or address book of the caller device. Such motion clips from user identifiers can be available as videos available for selection in block 320.

In another example, if the caller device is coupled to a companion device, e.g., a wearable device such as eyeglasses, smartwatch, wearable camera, etc. that includes a camera, the available videos may include video captured by the companion device. In yet another example, the available videos may include stock videos, e.g., videos associated with the location of the caller device. In some examples, stock videos may be available from the caller's storage and/or public sources on the internet, for example, e.g., websites, network services, map services, etc. Stock videos can be selected which are relevant to the caller context. For example, if the caller device location is at the Grand Canyon, stock videos may include videos of the Grand Canyon. In another example, the available videos may include an application video, e.g., a screen capture video captured from the output of one or more applications currently under execution on the caller device or having previously been executed on the caller device or a different device and stored in available storage.

The caller video may be selected based on the caller context. In various implementations, a respective selection score can be determined for one or more of the available videos, where the selection score for a video indicates a respective relevance to the caller context or interest level in the video given the caller context. In some implementations, the selection score for a video can be a value assigned within a predetermined range of values, based on one or more factors of the caller context. In some examples, various selection scores can be associated with particular context factors.

For example, a caller context factor that can be used in determining a selection score for a video can include the geographic location of the caller (obtained with user consent). Particular locations (e.g., provided in a stored list, database, or other association) can indicate a high relevance or interest level for videos that are being captured live by the caller at those locations, e.g., sightseeing locations, vacation locations, locations with well-known sights or monuments, locations at least a particular distance away from the home city of the caller, etc. If the current location of the caller matches any such particular locations, a video currently being captured by a caller device or recently captured by a caller device (e.g., within a predetermined time period before the present time of the call) can be assigned a high selection score. In some cases, an available stock video that is known to depict the caller's location can be assigned a high selection score, e.g., but a lower selection score than the live captured video. In contrast, if the caller's location is known (with user consent) to be a routine location often visited by the caller in past, or a locations indoors, etc., then live captured video from the caller's device can be assigned a low selection score based on the caller location.

Another caller context factor that can be used to determine a selection score for a video includes the current time and/or date. If, for example, the current time indicates that a sunset may be visible at the callee's location, then video being currently captured by the callee's device can be assigned a higher selection score. In contrast, if the current time indicates that it is nighttime, live captured video can be assigned a lower selection score. User calendar events (e.g., obtained with user consent) may also indicate whether the caller is at an event and thus whether the caller device's live video should be assigned a high or low selection score.

Other caller context factors that can be used to determine a selection score for a video includes an event at which the caller is participating (e.g., known, with user consent, from the caller's calendar), or whether other persons are with the caller (e.g., known based on user data such as calendar data, or analysis of one or more frames recorded by a camera on the caller's device (with user consent), etc.). Frames currently or recently recorded by front and back cameras can also be examined for suitability, e.g., whether the captured video is below a threshold luminance level and thus too dark to be used as the caller video, thus causing a low selection score to be assigned. Other video characteristics of a video can also be examined, e.g., color noise, blurriness, etc. to influence the selection score. Stored user preferences of the caller can also be used to influence selection score. For example, the caller may have indicated in user preferences that the back camera of the caller device is preferred for the caller video.

In some examples, if the caller is at the Grand Canyon or other sightseeing geographic location, a video captured by the back camera of the caller device at a time of the call, or prior to the call, may automatically be determined to have a high selection score due to the visual scenery located at that location (as known from stored indications of various locations' suitability), while video captured by the front camera may be determined to have a lower selection score than the back camera. In this example, the video captured by the back camera may be selected as the caller video, e.g., based on the higher selection score.

In another example, if the caller is at a birthday party event (e.g., known via user data, with user consent, such as user calendar data on the caller device), the front camera may capture the caller's face, and the back camera may capture happenings at the birthday party, e.g., another person blowing on candles or cutting a cake. In this example, the video captured by the front camera and the video captured by the back camera may be assigned an equal selection score to indicate an equal relevance or interest level (unless one or more other factors as described herein are present to indicate to assign a higher selection score to one of these cameras). Further, in some implementations, the equal selection score may be determined if it meets a threshold selection score. If not, the videos are not selected.

In another example, a video from a companion device may be selected based on the video having a high selection score. For example, the companion device can be a wearable camera and the caller can be engaged in an activity captured by the wearable camera, such as mountain biking, rock climbing, etc., as indicated by the caller location, movement rate, event or calendar data, or other data. In another example, an application video may be selected as the caller video based on the video having a high selection score. For example, the callee identifier may be associated with a customer support official that the caller previously interacted with in a call and the application is associated with the business of the customer support official, such that the video output from the application can be transmitted to the callee as the caller video to allow more effective customer support for the application. In some examples, the business of the customer support official can be determined from that official's address used in the previous call.

Some implementations can determine a total selection score for a video based on a combination of multiple individual scores, where each individual score is associated with a caller context factor used in determining the total selection score. In some examples, the multiple individual scores can be summed to obtain the total selection score. For example, a particular video might have a high individual selection score associated with a geographic location of the caller, but may have lower individual selection scores associated with current time and other factors, thus resulting in an average total selection score.

In various examples, when there are multiple available videos, a particular video may be selected as the caller video, where the particular video meets a threshold selection score and has a best (e.g., highest) selection score of the available videos, e.g., indicating a highest relevance or interest level. Some implementations can determine a total selection score for each available video as described above, or for a subset of available videos, and can select the video having the best (e.g., highest) total selection score as the caller video.

In some implementations, multiple videos may be selected to be transmitted as the caller video. For example, the multiple videos may be combined to generate the caller video. In some examples, videos having an equal selection score can be combined, or a particular number of the videos having the best selection scores can be combined. In another example, videos having the best selection scores and having selection scores within a particular threshold score range of each other can be combined. Some implementations can combine videos from different sources, e.g., one video from a front camera of the caller device and one video from a back camera of the caller device, or one video from a camera on the caller device and one or more other videos from storage on the caller device or from a server, network storage, or other network source. In some examples, the two videos can be combined into a combined video that can include the frames of the two videos adjacent to each other within the overall frame of the combined video. Some implementations can crop the individual videos as needed, or can display one or more of the videos more prominently (e.g., larger or uncropped) than one or more other videos. For example, videos having better selection scores can be displayed more prominently in the combined video. In other examples, multiple selected videos can be combined by overlapping at least a portion of the videos, e.g., one or more videos can be made partially transparent so that all the combined videos can be displayed superimposed in a particular screen area. Other techniques can be used to combine multiple selected videos.

While selection of the video is described with some examples, any individual video or combination of videos may be selected as the caller video based on the caller's context.

In some implementations, the caller video may be selected based on user input to the caller device that is effective to select the video, e.g., from the caller. For example, the caller may provide input to the caller device to select a front camera video as the caller video when the caller is wearing a funny hat, or a back camera video as the caller video, e.g., when the back camera captures a video of the caller's dog performing tricks. In various implementations, a suitable user interface may be provided on the caller device to enable the caller to select the caller video, e.g., the user interface may include user interface elements corresponding to different available videos (e.g., from the front camera, from the back camera, a stock video, etc.), a toggle element that permits the caller to switch between the front camera and the back camera, etc.

In some implementations, a selected video (e.g., a stored video, a portion of a selected video, selected live video from a camera on the caller device, etc.) can be displayed by the caller device before it is transmitted to the callee device as the caller video. For example, this display can act as a preview to allow the caller to view one or more videos that have been automatically selected to be transmitted to the callee as the caller video prior to the callee acceptance of the video call. The caller can be provided options of accepting and overriding the selected video, e.g., after viewing at least a portion of the selected video on the display. For example, the caller can select a rejection of the selected video (e.g., with one or more displayed user interface controls) and can select one or more other videos to be used as the caller video. In some examples, the caller can select the front camera and/or back camera of the caller device to transmit the live video captured by the selected camera(s), and/or the caller can browse and select one or more videos to transmit from a menu or list of stored videos accessible to the caller device. In some implementations providing combined videos that can include multiple videos, the caller may be provided an option to retain the selected video to be transmitted, and can add one or more user-selected videos to be combined with the selected video, such that the combined video is transmitted as the caller video.

In some implementations, e.g., if the caller context is insufficient to indicate a suitable caller video from the available videos, or if none of the available videos meet a threshold selection score, the caller video may be selected based on a default setting, e.g., video from a front camera of the caller device.

In block 322, it is determined if the selected caller video is to be filtered. In some implementations, the caller video may be filtered, if the caller indicates a preference to filter outgoing caller video. In some implementations, for example, the caller video may be filtered based on content of the caller video. In some implementations, e.g., when the acknowledgment from the callee device includes a preference for filtered video, the caller video may be filtered. If it is determined that the caller video is to be filtered, the method continues to block 324. If it is determined that the caller video is not to be filtered, the method continues to block 322.

In block 324, a video filter is applied to the selected caller video. In some implementations, the video filter may modify the caller video such that content of the video is blurred. For example, application of the video filter may result in a filtered video that has a reduced number of sharp edges or boundaries, or in which shapes of objects are discernible but not specific identities of objects. In some implementations, the video filter may apply a hexagon mosaic to the caller video. Application of the hexagon filter (or similar type of filter) may cause pixels of the video to be updated to values such that a hexagon pattern is seen in each frame of the filtered video, and details such as shapes of objects in the caller video are obfuscated. In various implementations, the video filter may be applied, e.g., to obfuscate identifiable information such as a face, a place, an object. In these implementations, the video filter may however provide indication of the contents of the caller video, e.g., by retaining outlines of faces/objects, by retaining color distribution of pixels, etc. For example, if the caller video includes a giant sequoia tree, the filtered video may include sufficient detail to indicate that the caller video has a tree, but not enough detail to determine that it is a giant sequoia tree. Some implementations can retain clarity of a background depicted behind foreground objects. FIG. 5B shows an example of a blurred caller video.

In block 326, the filtered caller video may be transmitted to the callee device from which the acknowledgment was received. The video may be transmitted over the connection established with the callee device, e.g., using the media encoding technique selected for the connection. In some implementations, the filtered caller video may omit audio data from the transmission such that the callee device will not output audio associated with the caller video. In some implementations, audio data can be transmitted in the filtered caller video. In some implementations, if the transmitted video has a defined end or termination (e.g., a stock video or other video captured or stored at a previous time) and the end of the video is transmitted, the video can be looped one or more additional times, e.g., such that the video is transmitted again from its start (e.g., until the call request is accepted by the callee or the call is terminated before acceptance). In some implementations, a video with a defined end can be transmitted once, or a particular number of times, and then no video is transmitted further. In some implementations, one or more different default videos can be transmitted (e.g., in looped manner or not) after the selected video has reached its end, and/or the one or more successive videos can be selected randomly from available videos.

In block 328, input to disable the filter may be received. In some implementations, the input to disable the filter may be received from the caller. For example, the caller may select an option to disable the video filter from a user interface on the caller device, e.g., by touching the option on a touchscreen, by selecting the option with a pointing device such as a mouse, etc. In another example, the caller may disable the filter by a voice command.

In some implementations, the input to disable the filter may be received from the callee device. In the implementations where the input to disable the video filter is received as an indication from the callee device, such indication is received prior to an acceptance of the call request by the callee. The indication can indicate to disable the video filter, and/or in some implementations, the indication can indicate other information. For example, the indication can indicate that the callee device has detected a face and the indication can also indicate to disable the video filter. In some implementations, only the indication is received that the callee device has detected a face, and the caller device can consider this an indication to disable the video filter, e.g., based on known preferences of the callee, default settings, etc. Other actions or states detected by the callee device that can be used to indicate to disable the video filter are described below with reference to FIG. 4.

In block 330, the filter is disabled, e.g., based on the received input of block 328. In various implementations, the filter may be disabled such that the caller video is transmitted to the callee device without blurring or other modifications.

In block 334, acceptance of the call request may be received from the callee device over the established connection. For example, the acceptance may be received in response to the callee providing input to answer the call, e.g., by selecting an option to answer the call that is displayed on a screen of the callee device, by a voice command, etc. Based on the callee providing the input to answer the call, the acceptance of the call request may be transmitted by the callee device to the caller device. The acceptance of the call request may be received after at least a portion of the caller video is transmitted to the callee device. For example, if the caller video is a stored video having a defined length, at least a portion of this video was transmitted prior to receiving the acceptance of the call.

In block 340, the video call is established and conducted such that the caller and the callee may engage in a video call over the connection. In various implementations, the caller video transmitted prior to acceptance may or may not need to be changed to a different video transmitted from the caller during the video call. For example, in some cases, e.g., if the caller video transmitted prior to callee acceptance was a live video of the caller captured by a camera of the caller device, then the source and content of the caller video need not be changed upon receipt of the acceptance of the call request (e.g., unless the video call was filtered, as described below), and in some examples, the caller video can continue to be transmitted during the established video call similarly as it was transmitted prior to the callee acceptance. In some cases, e.g., if the caller video prior to callee acceptance is a live video not showing the caller (e.g., captured by a rear camera of the caller device) or is a video previously-captured or recorded video, then the caller video can be changed after receipt of acceptance of the call request to a live video depicting the caller, e.g., being captured by a front camera of the callee device or other camera.

In some implementations, upon receipt of acceptance of the call request by the callee, audio transmission from the caller device may be enabled, such that the callee device can output the caller audio. In some implementations, e.g., when the caller video is filtered and input to disable the filter was not previously received, the video filter may be disabled in response to receipt of the acceptance of the call request. Further, in some implementations, upon receipt of acceptance of the call request by the callee, audio and/or video transmission from the callee device may be enabled. In some cases or implementations, the connection may be updated to enable transmission of media (e.g., audio/video) from the callee device to the caller device. The caller device may output callee audio and display callee video received from the callee device.

If it is determined in block 322 that the caller video is not to be filtered, the block 332 may be performed. In block 332, the selected caller video may be transmitted without filtering, e.g., without any modification.

Figure 4:
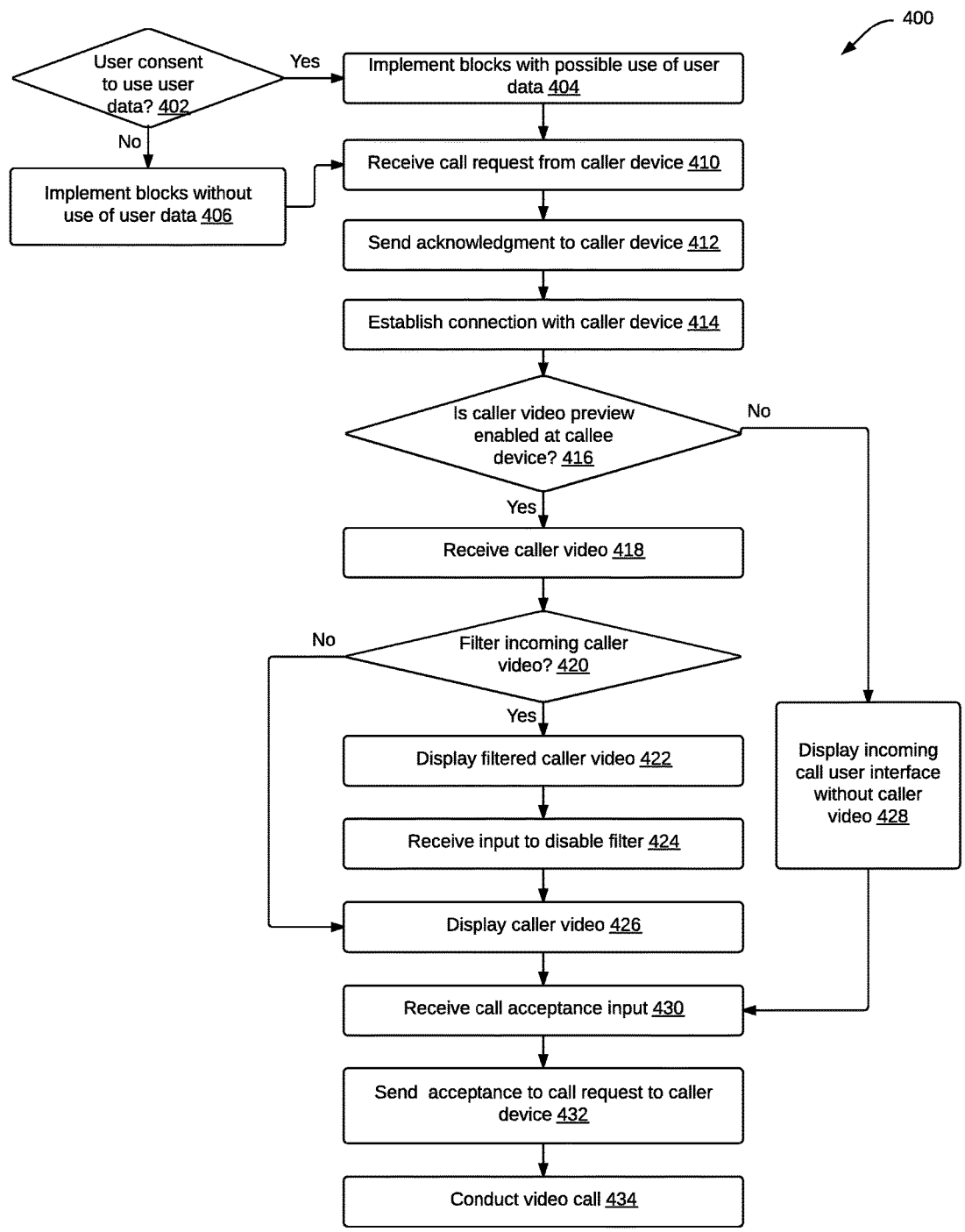
FIG. 4 is a flow diagram illustrating an example method for a callee device, according to some implementations.

FIG. 4 is a flow diagram illustrating an example method 400 for a callee device, according to some implementations. Some or all of the method 400 can be implemented, for example, on a system such as one or more client devices 120, 122, 124, or 126 as shown in FIG. 1. In some implementations, method 400 can be implemented on a server system 102 as shown in FIG. 1, and/or on both a server system and a client system. In described examples, the implementing system includes one or more processors or processing circuitry, and one or more storage devices. In some implementations, different components of one or more clients and/or servers can perform different blocks or other parts of the method 400.

In block 402, it is checked whether user consent (e.g., user permission) has been obtained to use user data in the implementation of method 400. For example, user data can include user preferences, user biometric information, user characteristics (identity, name, age, gender, profession, etc.), information about a user's social network and contacts, social and other types of actions and activities, content, ratings, and opinions created or submitted by a user, a user's current location, historical user data, etc. One or more blocks of the methods described herein may use such user data in some implementations. If user consent has been obtained from the relevant users for which user data may be used in the method 400, then in block 404, it is determined that the blocks of the methods herein can be implemented with possible use of user data as described for those blocks, and the method continues to block 410. If user consent has not been obtained, it is determined in block 406 that blocks are to be implemented without use of user data, and the method continues to block 410. In some implementations, if user consent has not been obtained, the remainder of method 400 is not performed.

In block 410, a call request is received at a callee device, where the call request originated from a caller device. In block 412, an acknowledgment is sent to the caller device. In various implementations, the acknowledgment is sent automatically, without user input. The acknowledgment may indicate, for example, that the callee device is reachable via the network.

In some implementations, the acknowledgment may further include a preference for filtered video, as described above. The preference for filtered video or for unfiltered video may be automatically determined by the callee device based on a variety of factors. For example, when the callee consents to use of user data, the callee device may determine that it (and the callee) are in a public location, such as a store, train station, etc., (based on sensed location data) and determines that there is a preference for filtered video. In another example, if the callee consents to use of user data, the callee device may determine that the callee is in a meeting (e.g., a business meeting at the callee's work location, based on location data and/or user calendar data or other user data) and determine that there is a preference for filtered video. In another example, the callee device may determine that it is placed approximately flat, e.g., on a table, with the callee device screen facing up (e.g., based on one or more motion sensors of the callee device), and determine that there is a preference for filtered video, e.g., since the callee device screen is visible. In another example, when the callee consents to use of user data, the callee device may determine that the callee is at home and that the callee device is unlocked (e.g., it is accessible for use, or is currently being used by the callee), and determine that there is a preference for unfiltered caller video. A combination of location, callee's calendar, phone orientation, and other factors may be used to determine the preference for filtered video or video that is not filtered.

In block 414, a connection is established with the caller device. The connection may be established as described with reference to block 314 of FIG. 3.

In block 416, it is determined whether caller video preview is enabled at the callee device. For example, a callee may select an option such that caller video preview is disabled, e.g., in call settings or preferences that apply to all callers, or specific callers. In another example, caller video preview may be disabled, e.g., when available bandwidth over the connection is not sufficient for caller video preview, if the connection is a metered connection, etc. If it is determined that caller video preview is enabled at the callee device, the method continues to block 418. If it is determined that caller video preview is disabled at the callee device, the method continues to block 428.

In block 418, caller video is received over the established connection. In various implementations, the caller video may be received using a media encoding technique identified for the connection, e.g., similarly as described above with reference to FIG. 3.

In block 420, it is determined whether the incoming caller video is to be filtered in its display by the callee device. In some implementations, it may be determined whether the incoming caller video has been filtered previously, e.g., by the caller device as described with reference to FIG. 3. In some implementations, determination of whether incoming caller video is already filtered may be performed by analyzing the incoming caller video, e.g., to determine whether the incoming video is blurred or filtered in other ways. In some implementations, determination of whether incoming caller video is already filtered may be based on a parameter transmitted by the caller device and associated with the caller video, indicating the filtered status of the caller video. Further, it may be determined whether the callee has a preference for filtered video, e.g., based on a filter setting stored on the callee device. If it is determined that the incoming caller video is not filtered and that the callee has a preference for filtered video, it may be determined that the caller video is to be filtered by the callee device. If it is determined that the incoming caller video is to be filtered for its display, the method continues to block 422. If it is determined that the incoming caller video is not to be filtered for its display, the method continues to block 426.

In block 422, filtered caller video is displayed, e.g., on a screen of the callee device. If it is determined in block 420 that the incoming caller video is not already filtered, the incoming caller video may be filtered by the callee device prior to displaying on the screen of the callee device. The callee device may filter the incoming caller video by applying one or more video filters, as described previously with reference to block 324 of FIG. 3.

In block 424, input may be received to disable the filter in some cases or implementations. In various implementations, such input may include, e.g., a command from the callee or an action performed by the callee. For example, the callee device may receive the command from the callee as a touch input on a touchscreen display, a voice command, etc. For example, the action performed by the callee may include picking up the callee device from a stationary state, where the picking up can be detected by the callee device based on one or more motion sensors of the callee device (e.g., accelerometers and/or gyroscopes). In another example, the action performed by the callee can include unlocking the callee device, e.g., selecting one or more controls of the callee device to unlock one or more callee device functions. In another example, the action performed by the callee can include the callee glancing at the callee device. For example, if the callee user has consented to use of user data, the input to disable the filter may include the callee device detecting a face. For example, the face may be detected by analyzing video from a camera of the callee device, such as a front camera of the callee device. In some implementations, face detection can be performed if the callee device senses it is being picked up. The callee device can identify the callee in other ways in some implementations with callee consent, e.g., a fingerprint scanner. In the implementations where the incoming caller video is already filtered, in response to the input to disable the filter received at block 424, the callee device may transmit an indication to the caller device to disable its use of one or more video filters to filter the incoming caller video. In the implementations where the incoming caller video is not already filtered, and a video filter is applied by the callee device, the video filter at the callee device may be disabled in response to the input received at block 424.

In block 426, the incoming caller video is displayed, e.g., on a screen of the callee device. The caller video may be displayed without filtering, e.g., if filtering was not applied or was disabled in block 424. In some implementations, a specialized user interface is displayed to indicate that the caller video is a preview video that is being received prior to a video call being established. For example, a smaller video window can be displayed by the callee device to display the caller video preview as compared to a larger video window used for an established video call, and/or one or more other visual indicators of the preview video can be displayed in a user interface.

In block 430, call acceptance input is received at the callee device from the callee. For example, the acceptance input may include the callee providing input to answer the call, e.g., by selecting an option to answer the call that is displayed on a screen of the callee device, by a voice command, etc.

In block 432, the acceptance of the call request may be transmitted by the callee device to the caller device over the network. In block 434, the video call is established and conducted, e.g., as described with reference to block 340 of FIG. 3. In some implementations, filtering of the caller video, if provided and not disabled prior to this block, can be disabled upon callee acceptance of the call. Some implementations can continue to filter the caller video after call acceptance, e.g., based on caller and/or callee preferences.

If it is determined in block 416 that caller video preview is not enabled at the callee device, block 428 may be performed. In block 428, a user interface for incoming calls is displayed by the callee device without the caller video. For example, the incoming call user interface may include user interface elements for the incoming call, e.g., as illustrated in FIG. 5A, but exclude the caller video.

FIGS. 5A-5E are diagrammatic illustrations of example representations of a user interface showing one or more features described herein, according to some implementations. FIGS. 5A-5E each show an example user interface displayed on a callee device. Some reference numerals are omitted from FIGS. 5A-5E for simplicity.

In FIG. 5A, a first user interface 500 is illustrated. As illustrated in FIG. 5A, a notification of an incoming video call request from a caller "Wally M." is displayed in the user interface 500. The notification includes an indication or identification 502 of a user that is calling, which in this case is a text indication. The notification also includes a user interface element 504 that is selectable by a callee to answer the call, e.g., via a touchscreen, voice command, or other input device. In the example illustrated in FIG. 5A, the acknowledgment has not yet been received by the caller device, and no caller video is displayed.

In FIG. 5B, user interface 500 is shown at another stage of the video call. In the example illustrated in FIG. 5B, the acknowledgment from the callee device has been received by the caller device, and accordingly, the caller device selects and transmits a caller video that is received by the callee device displaying interface 500. In the example illustrated in FIG. 5B, the selected video is the live video being captured by the front camera on the caller device, which captures the face of the caller. In another example, the selected video can be the live video being captured by the back camera of the caller device, which captures the face of a person located in the view of the back camera. In still another example, the selected video can be a pre-stored or pre-recorded video that is provided from storage accessible to the caller device.

In this example, one or more video filters are enabled (e.g., at the caller device and/or at the callee device), and accordingly, a filtered caller video 510 is displayed such that a blurred face is shown, indicated by a blurred outline in FIG. 5B. Further, user interface elements such as the user interface element 504 and the text indication 502 "Video call from Wally M." and the text "Swipe up to answer" are overlaid on top of the filtered caller video.

FIG. 5C shows another example of user interface 500. In this example, the video filter has been disabled, e.g., in response to input to disable the filter as discussed above with reference to FIGS. 3 and 4. As illustrated in FIG. 5C, caller video 520 is displayed without filtering such that it clearly shows a face that may be recognizable by the callee, e.g., the face of the caller. Further, user interface elements such as the user interface element 504 and the text indication 502 "Video call from Wally M." and the text "Swipe up to answer" are overlaid on top of the caller video.

FIG. 5D shows another example of user interface 500. In this example, the user interface element 504 is shown displaced, e.g., moved upwards, from its original position, as shown in FIGS. 5A-5C. In some implementations, the user interface element 504 may be displaced in response to input, e.g., touch input from the callee. In this example, the displacement of the user interface element 504 by the callee indicates that the callee is accepting the video call. Other implementations can allow the callee to accept the call in other ways, e.g., selecting, tapping, or clicking the element 504, inputting a voice command, inputting a motion command by moving the callee device in a pre-configured manner as detected by motion sensors of the callee device, etc. Further, FIG. 5D illustrates an updated caller video 530, that shows a second face, e.g. of a second person that has entered the caller video.

In FIG. 5E, a user interface 540 illustrated. In this example, the user interface 540 is a video call interface, where the video call is established and in progress after the acceptance of the video call by the callee as shown in FIG. 5D. In the example of FIG. 5E, the user interface overlay is no longer a part of the user interface for the video call interface, such that the caller video 542 is displayed on the full screen of the callee device. In addition, a callee video 544 is displayed to show the appearance of the callee user as captured by a front camera of the callee device.

The blocks and operations described in the methods disclosed herein can be performed in a different order than shown or described, and/or performed simultaneously (partially or completely) with other blocks or operations, where appropriate. Some blocks can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices 120, 122, 124, or 126 as shown in FIG. 1. In some implementations, one or more methods described herein can be implemented, for example, on a server system 102 as shown in FIG. 1, and/or on both a server system and a client system. In some implementations, different components of one or more servers and/or clients can perform different blocks, operations, or other parts of the methods.

Figure 6:
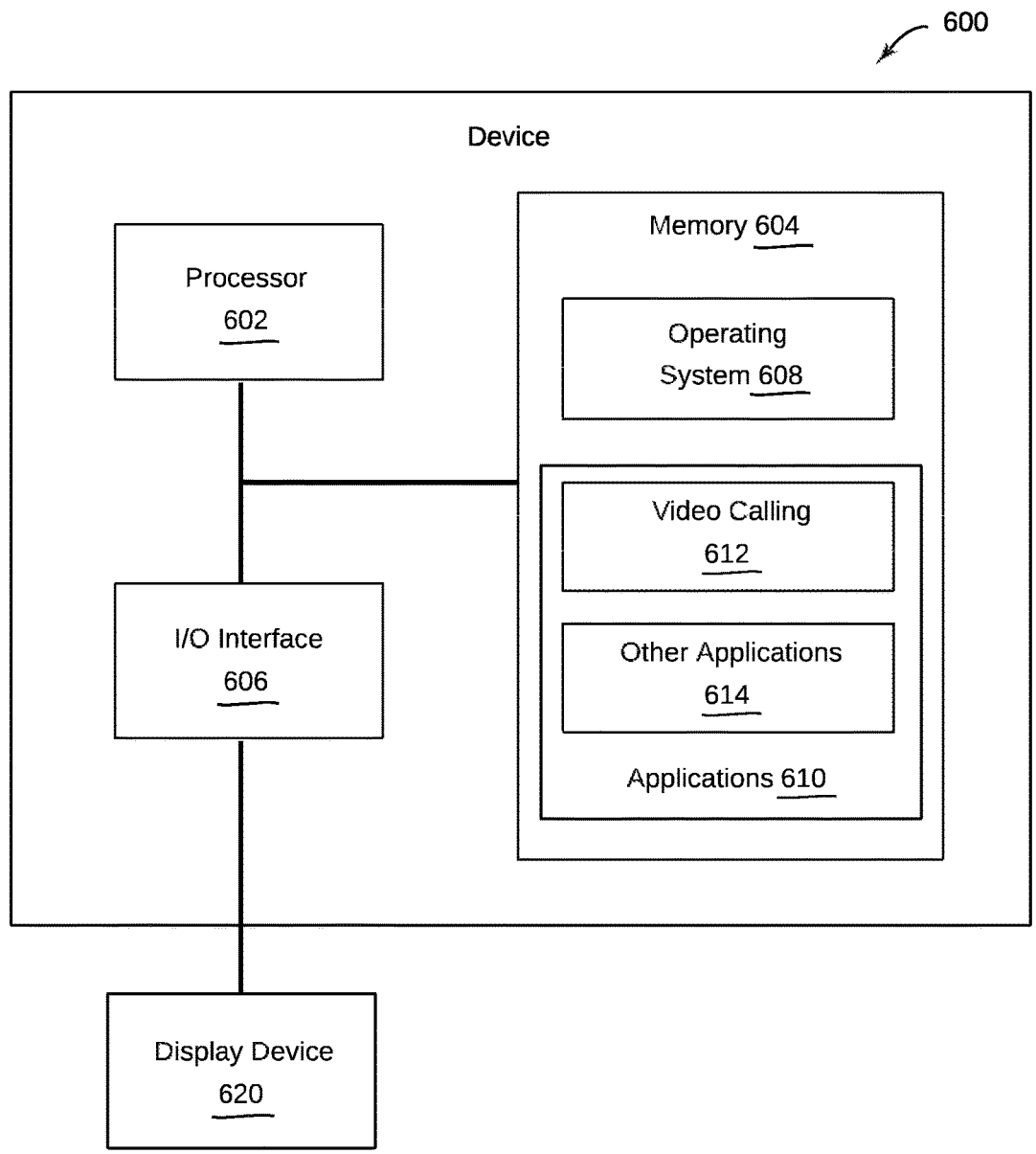
FIG. 6 is a block diagram of an example device which may be used for one or more implementations described herein.

FIG. 6 is a block diagram of an example device 600 which may be used to implement some implementations described herein. In one example, device 600 may be used to implement a computer device that implements a server device, e.g., server device 104 of FIG. 1, and perform appropriate method implementations, or portions thereof, described herein. Device 600 can be any suitable computer system, server, or other electronic or hardware device. For example, the device 600 can be a mainframe computer, desktop computer, workstation, portable computer, or electronic device (portable device, cell phone, smart phone, tablet computer, television, TV set top box, personal digital assistant (PDA), media player, game device, wearable device, remote control, handheld game- or device-controller, etc.).

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 600 includes a processor 602, a memory 604, and input/output (I/O) interface 606. Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608 and one or more applications 610 such as a data display engine, web hosting engine, image display engine, notification engine, social networking engine, etc. In some implementations, the applications engines 610 can include instructions that enable processor 602 to perform functions described herein, e.g., some or all of the methods of FIGS. 2-4. For example, applications 610 can include one or more communication applications 612, including a program to enable video calls with other devices and display of caller video on a display device of the device 600. A communication program, for example, can provide a displayed user interface responsive to user input to display selectable options/controls, user contacts, and communicated data based on selected options. Other applications or engines 614 can also or alternatively be included in applications 610, e.g., image editing applications, media display applications, web hosting engine or application, etc. One or more methods disclosed herein can operate in several environments and platforms, e.g., as a stand-alone computer program that can run on any type of computing device, as a web application having web pages, as a mobile application ("app") run on a mobile computing device, etc.

Any of software in memory 604 can alternatively be stored on any other suitable storage location or computer-readable medium. In addition, memory 604 (and/or other connected storage device(s)) can store images, image metadata (including video call settings, etc.), contact information, data structures, and other information, user preferences, and/or other instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the server device 600 with other systems and devices. For example, network communication devices, storage devices (e.g., memory and/or database 106), and input/output devices can communicate via interface 606. In some implementations, the I/O interface can connect to interface devices such as input devices (keyboard, pointing device, touchscreen, microphone, camera, scanner, etc.) and/or output devices (display device, speaker devices, printer, motor, etc.). Display device 620 is one example of an output device that can be used to display content, e.g., one or more videos, images, animations, contact information, etc. provided in a user interface of an output application as described herein. Display device 620 can be connected to device 600 via local connections (e.g., display bus) and/or via networked connections and can be any suitable display device, some examples of which are described below.

For ease of illustration, FIG. 6 shows one block for each of processor 602, memory 604, I/O interface 606, and software blocks 608 and 610. These blocks may represent one or more processors or processing circuitries, operating systems, memories, I/O interfaces, applications, and/or software modules. In other implementations, server device 600 may not have all of the components shown and/or may have other elements including other types of elements instead of, or in addition to, those shown herein. While system 102 is described as performing blocks and operations as described in some implementations herein, any suitable component or combination of components of system 102 or similar system, or any suitable processor or processors associated with such a system, may perform the blocks and operations described.

A client device can also implement and/or be used with one or more features described herein, e.g., client devices 120-126 shown in FIG. 1. Example client devices can include some similar components as the device 600, such as processor(s) 602, memory 604, and I/O interface 606. An operating system, software and applications suitable for the client device can be provided in memory and used by the processor, e.g., video calling software, client group communication application software, etc. The I/O interface for a client device can be connected to network communication devices, as well as to input and output devices, e.g., a microphone for capturing sound, GPS sensor for sensing geographic location, one or more cameras for capturing images or video, audio speaker devices for outputting sound, one or more companion devices in communication with the device 600, a display device for outputting images or video, and/or other input and output devices. A display device 620, for example, can be connected to or included in device 600 to display images as described herein, where such device can include any suitable display device such as an LCD, LED, or plasma display screen, CRT, television, monitor, touchscreen, 3-D display screen, projector, or other visual display device. Some implementations can provide an audio output device, such as voice output or synthesis that speaks text.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

One or more systems and methods discussed herein do not require collection or usage of user personal information. In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A method comprising:
    sending, by a caller device, a call request to one or more callee devices, wherein the caller device includes a plurality of cameras, and wherein at least one camera of the plurality of cameras is associated with one or more particular locations;
    establishing a connection with at least one callee device of the one or more callee devices prior to receiving an acceptance of the call request from the at least one callee device;
    determining a caller context, wherein determining the caller context includes determining a geographic location of the caller device;
    based on the determined caller context, selecting a caller video from a plurality of videos available for transmission by the caller device, wherein selecting the caller video from the plurality of videos comprises selecting a video being captured by the at least one camera in response to determining that the geographic location of the caller device matches at least one of the one or more particular locations; and
    transmitting at least a portion of the selected caller video over the connection with the at least one callee device prior to receiving the acceptance of the call request by the at least one callee device.

2. The method of claim 1 wherein the plurality of videos available for transmission by the caller device include
    a stored stock video that is associated with the geographic location of the caller device.

3. The method of claim 1 further comprising obtaining one or more preferences of at least one callee user of the at least one callee device related to video content to receive by the at least one callee device, wherein selecting the caller video is additionally based on the one or more preferences of the at least one callee.

4. The method of claim 1 wherein the plurality of videos include a video from a camera of the plurality of cameras and an application video from an application under execution on the caller device, wherein selecting the caller video includes selecting one or more of the video from the camera of the plurality of cameras and the application video from the application under execution on the caller device.

5. The method of claim 1 wherein selecting the caller video includes selecting an available stored video that depicts a scene at the geographic location of the caller device.

6. The method of claim 1 wherein selecting the caller video includes selecting a video captured from a camera of the plurality of cameras in response to determining that the caller device has been previously located at the geographical location of the caller device.

7. The method of claim 1 wherein determining the caller context includes determining whether the caller device is present at an event as indicated by a user calendar associated with the caller device.

8. The method of claim 1 wherein selecting the caller video includes selecting, based on a current time of the call request,
    a stored stock video.

9. The method of claim 1 wherein audio data included in the selected video is not transmitted with the at least a portion of the selected caller video that is transmitted over the connection prior to receiving the acceptance of the call request.

10. The method of claim 9 wherein, in response to receiving the acceptance of the call request, transmitting the audio data in association with the transmission of the selected caller video over the connection during a video call.

11. The method of claim 1 further comprising, in response to receiving the acceptance of the call request, selecting and transmitting a second video over the connection during a video call, wherein the second video is different than the selected video.

12. A call device comprising:
    a storage device;
    a display;
    a plurality of cameras, wherein at least one camera of the plurality of cameras is associated with one or more particular locations; and
    at least one processor coupled to the display and configured to access the storage device, the at least one processor configured to perform operations comprising:
        sending, by the call device, a call request to one or more callee devices;
        establishing a connection with at least one callee device of the one or more callee devices prior to receiving an acceptance of the call request from the at least one callee device;
        determining a caller context, wherein determining the caller context includes determining a geographic location of the call device;
        based on the determined caller context, selecting a caller video from a plurality of videos available for transmission by the caller device, wherein selecting the caller video from the plurality of videos comprises selecting at least one video being captured by the at least one camera in response to the geographic location of the call device matching at least one of the one or more particular locations; and
        transmitting at least a portion of the selected caller video over the connection with the at least one callee device prior to receiving the acceptance of the call request by the at least one callee device.

13. The call device of claim 12 wherein the operation of selecting the caller video includes selecting the at least one video being captured by the at least one camera in response to the current time being a particular time of day that is determined to be associated with the at least one video.

14. The call device of claim 12 wherein the plurality of videos available for transmission by the caller device include a stored stock video that is associated with one or more geographical locations.

15. The call device of claim 12 wherein the operation of determining the caller context includes determining a current time.

16. The call device of claim 15 wherein the operation of selecting the caller video includes selecting an available stored video that depicts a scene at the geographic location of the call device.

17. The call device of claim 12 wherein the at least one processor is further configured to perform an operation comprising obtaining one or more preferences of at least one callee of the callee device related to video content to receive by the at least one callee device, wherein selecting the caller video is additionally based on the one or more preferences of the at least one callee.

18. A non-transitory computer readable medium having stored thereon software instructions that, when executed by a processor, cause the processor to perform operations comprising:

sending, by a caller device, a call request to one or more callee devices, wherein the caller device includes a plurality of cameras, and wherein a particular camera of the plurality of cameras is associated with one or more particular locations;

establishing a connection with at least one callee device of the one or more callee devices prior to receiving an acceptance of the call request from the at least one callee device;

determining a caller context, wherein determining the caller context includes determining a geographic location of the caller device;

based on the determined caller context, selecting a caller video from a plurality of videos available for transmission by the caller device, wherein selecting the caller video from the plurality of videos comprises selecting a video being captured by the particular camera in response to the geographic location of the caller device matching at least one of the one or more particular locations; and transmitting at least a portion of the selected caller video over the connection with the at least one callee device prior to receiving the acceptance of the call request by the at least one callee device.

19. The computer readable medium of claim 18 wherein the plurality of videos available for transmission by the caller device include a stored stock video that is associated with one or more geographical locations.

* * * * *